(12) United States Patent
Matsumoto

(10) Patent No.: US 11,123,877 B2
(45) Date of Patent: Sep. 21, 2021

(54) ROBOT HAND

(71) Applicant: Fanuc Corporation, Yamanashi (JP)

(72) Inventor: Ryou Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 16/538,047

(22) Filed: Aug. 12, 2019

(65) Prior Publication Data

US 2020/0070353 A1 Mar. 5, 2020

(30) Foreign Application Priority Data

Aug. 31, 2018 (JP) .............................. JP2018-162299

(51) Int. Cl.
| | |
|---|---|
| *B25J 13/02* | (2006.01) |
| *B25J 9/16* | (2006.01) |
| *B25J 13/08* | (2006.01) |
| *G01M 1/12* | (2006.01) |

(52) U.S. Cl.
CPC ............. *B25J 13/02* (2013.01); *B25J 9/1612* (2013.01); *B25J 9/1661* (2013.01); *B25J 13/085* (2013.01); *G01M 1/122* (2013.01)

(58) Field of Classification Search
CPC ..................................... B25J 13/02; B25J 9/16
See application file for complete search history.

(56) References Cited

U.S. PATENT DOCUMENTS

| | | | |
|---|---|---|---|
| 2011/0089709 A1 | 4/2011 | Neeper | |
| 2013/0336755 A1 | 12/2013 | Neeper | |
| 2014/0316572 A1* | 10/2014 | Iwatake | ................. B25J 9/1612 |
| | | | 700/258 |

(Continued)

FOREIGN PATENT DOCUMENTS

| | | |
|---|---|---|
| EP | 3321043 A2 | 5/2018 |
| JP | S52-040484 U | 3/1977 |

(Continued)

OTHER PUBLICATIONS

Sadamitsu, Daiki; Notice of Reasons for Refusal; Japanese Patent Application No. 2018-162299; dated Jan. 12, 2021; 3 pages.

(Continued)

*Primary Examiner* — Kira Nguyen
(74) *Attorney, Agent, or Firm* — Shackelford, Bowen, McKinley & Norton, LLP

(57) ABSTRACT

Provided is a robot hand including: gripping portions disposed with spacings between each other in a circumferential direction about an axis, and that grip a workpiece; driving portions, each of which is provided so as to correspond to one of the gripping portions, cause the corresponding gripping portions to be linearly moved in closing directions in which the gripping portions are brought close to the axis and opening directions in which the gripping portions are moved away from the axis; and a center-of-gravity detecting unit detects a center-of-gravity position of the workpiece being gripped by the gripping portions. Each of the driving portions adjust, based on the center-of-gravity position of the workpiece, the position of the corresponding gripping portion in a direction in which the center-of-gravity position is brought closer to the axis.

4 Claims, 8 Drawing Sheets

(56) References Cited

U.S. PATENT DOCUMENTS

| | | | | |
|---|---|---|---|---|
| 2014/0316573 | A1* | 10/2014 | Iwatake | B25J 9/1697 700/258 |
| 2016/0136789 | A1* | 5/2016 | Fukui | B25B 5/003 269/32 |
| 2018/0126551 | A1* | 5/2018 | Amano | B25J 9/1612 |

FOREIGN PATENT DOCUMENTS

| | | |
|---|---|---|
| JP | S57-166690 U | 10/1982 |
| JP | S60-190591 U | 12/1985 |
| JP | S61-019577 A | 1/1986 |
| JP | S62-152686 A | 7/1987 |
| JP | H02-298487 A | 12/1990 |
| JP | H03-294197 A | 12/1991 |
| JP | H06-187038 A | 7/1994 |
| JP | 2002-361588 A | 12/2002 |
| JP | 2003-094367 A | 4/2003 |
| JP | 2005-144575 A | 6/2005 |
| JP | 2007-105878 A | 4/2007 |
| JP | 2011-183474 A | 9/2011 |
| JP | 2011-235374 A | 11/2011 |
| JP | 2011-240421 A | 12/2011 |
| JP | 2012-110992 A | 6/2012 |
| JP | 2012-240182 A | 12/2012 |
| JP | 2014-210311 A | 11/2014 |
| JP | 2017-127971 A | 7/2017 |
| JP | 2018-089752 A | 6/2018 |
| WO | WO-2011050112 A2 | 4/2011 |

OTHER PUBLICATIONS

Industrial Property Cooperation Center; Search Report by Registered Search Organization; Japanese Patent Application No. 2018-162299; dated Dec. 22, 2020; 6 pages.

Matsui, Hironori; Notice of Reasons for Refusal; Japanese Patent Application No. 2018-162299; dated Jun. 22, 2021; 4 pages.

* cited by examiner

ROBOT HAND

CROSS-REFERENCE TO RELATED APPLICATIONS

This application is based on Japanese Patent Application No. 2018-162299, the contents of which are incorporated herein by reference.

TECHNICAL FIELD

The present invention relates to a robot hand.

BACKGROUND ART

In the related art, a robot hand attached to a transferring robot is changed in accordance with the type of workpiece serving as a transferring target. A robot hand is designed for each type of workpiece in accordance with the shape and dimensions of the workpiece. Therefore, it is necessary to manufacture multiple types of robot hands, which is costly. In particular, high cost is incurred for machining gripping portions having three-dimensional shapes in accordance with the shapes of the workpieces. Storing many robot hands also requires a large space.

In order to eliminate such problems, robot hands that can cope with various workpieces have been devised (for example, see Patent Literatures 1 to 7).

CITATION LIST

Patent Literatures

{PTL 1} Japanese Unexamined Patent Application, Publication No. 2007-105878
{PTL 2} Japanese Unexamined Utility Model Application, Publication No. Sho 60-190591
{PTL 3} Japanese Unexamined Patent Application, Publication No. 2011-183474
{PTL 4} Japanese Unexamined Patent Application, Publication No. 2005-144575
{PTL 5} Japanese Unexamined Utility Model Application, Publication No. Sho 57-166690
{PTL 6} Japanese Unexamined Patent Application, Publication No. Hei 02-298487
{PTL 7} Japanese Unexamined Patent Application, Publication No. Hei 03-294197

SUMMARY OF INVENTION

An aspect of the present invention is a robot hand including: a plurality of gripping portions that are disposed, with spacings between each other, in a circumferential direction about a predetermined axis, and that grip a workpiece; a plurality of driving portions, each of which is provided so as to correspond to one of the plurality of gripping portions, that cause the corresponding gripping portions to be linearly moved in closing directions in which the gripping portions are brought close to the predetermined axis and opening directions in which the gripping portions are moved away from the predetermined axis; and a center-of-gravity detecting unit that detects a center-of-gravity position of the workpiece being gripped by the plurality of gripping portions, wherein each of the plurality of driving portions adjusts, on the basis of the center-of-gravity position of the workpiece detected by the center-of-gravity detecting unit, the position of the corresponding gripping portion in a direction in which the center-of-gravity position is brought closer to the predetermined axis.

In the above-described aspect, each of the plurality of driving portions may adjust the position of the corresponding gripping portion so as to be at a position at which the center-of-gravity position of the workpiece detected by the center-of-gravity detecting unit is disposed vertically below the predetermined axis.

In the above-described aspect, at least one of the plurality of gripping portions may be supported so as to be freely pivotable about the predetermined axis.

The above-described aspect may be provided with a pivoting restricting member that restricts pivoting of the at least one of the gripping portions about the predetermined axis within a predetermined angle range.

DESCRIPTION OF EMBODIMENT

A robot hand 1 and a robot system 100 according to an embodiment of the present invention will be described below with reference to the drawings.

Figure 1:
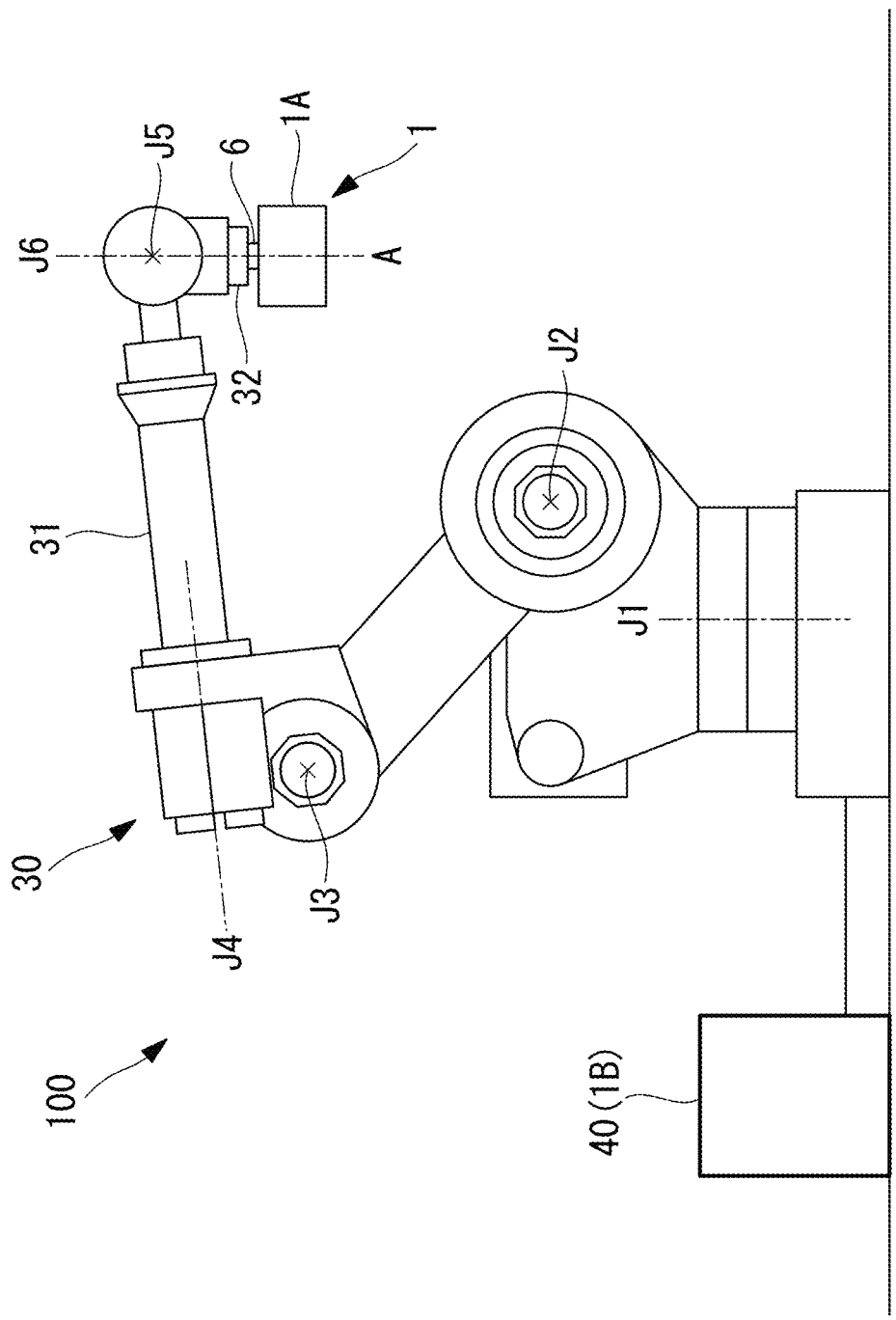
FIG. 1 is a schematic diagram showing the overall configuration of a robot system provided with a robot hand according to an embodiment of the present invention.

As shown in FIG. 1, the robot system 100 according to this embodiment is provided with: a robot 30; the robot hand 1; and a controller 40 that controls the robot 30 and a hand main body 1A of the robot hand 1. The robot system 100 grips, for example, workpieces W being transferred by a conveyer with the hand main body 1A one at a time and transfers the workpieces W to predetermined transferring positions.

The robot 30 is a robot used for transferring the workpieces W, and is, for example, a vertical articulated robot having six axes (J1, J2, J3, J4, J5, and J6). The robot 30 may be another type of robot such as a parallel-link robot. The hand main body 1A is attached to a wrist flange 32 at a tip of a robot arm 31 of the robot 30. The controller 40 is connected to the robot 30 and the hand main body 1A. The controller 40 controls the operation of the robot arm 31 by transmitting robot-controlling signals to servomotors provided at joints of the robot arm 31. The controller 40 controls the operation of the hand main body 1A by transmitting hand-controlling signals to the hand main body 1A.

Figure 2:
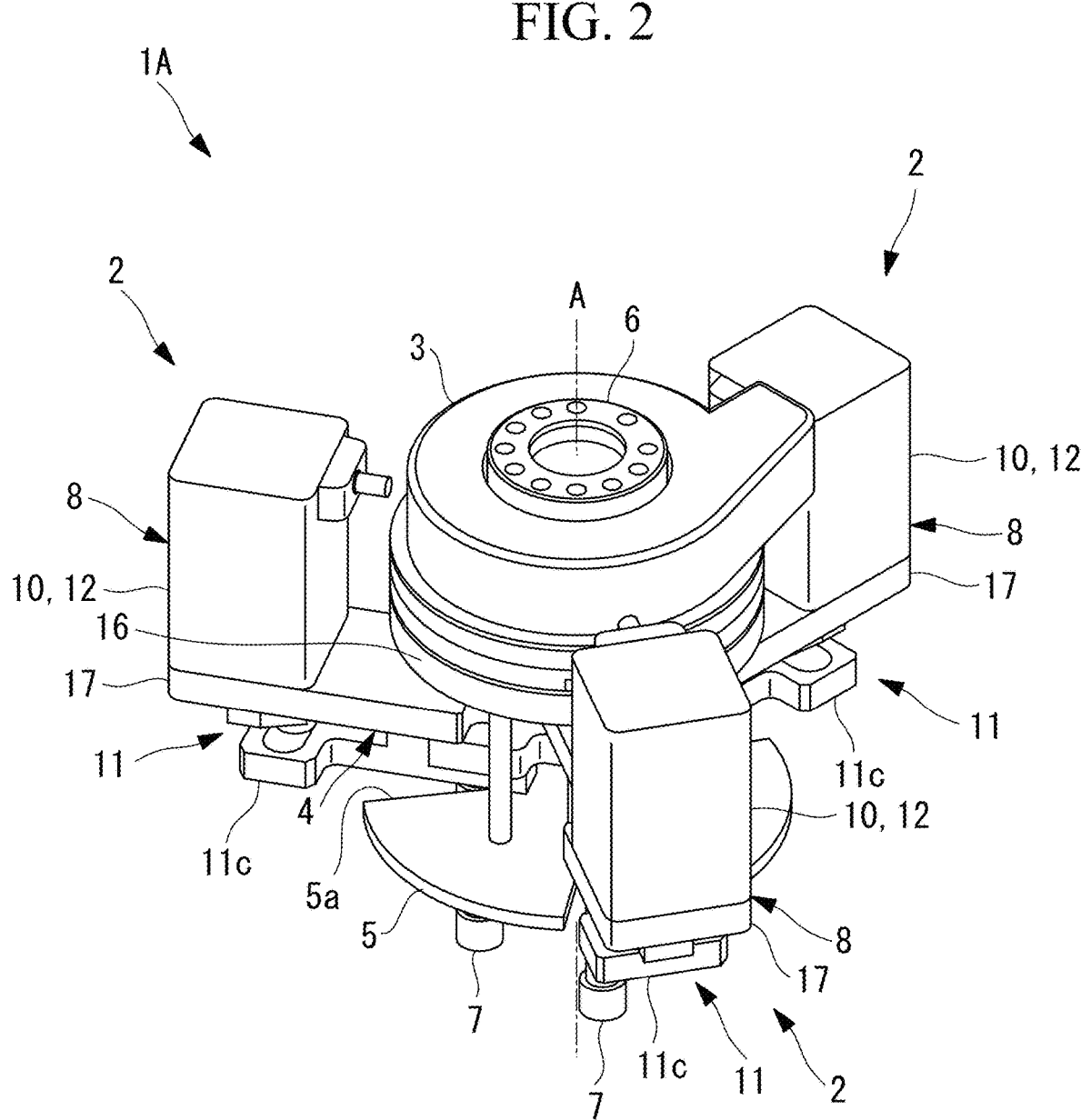
FIG. 2 is a perspective view in which a hand main body of the robot hand according to the embodiment of the present invention is viewed from a top side.
Figure 3:
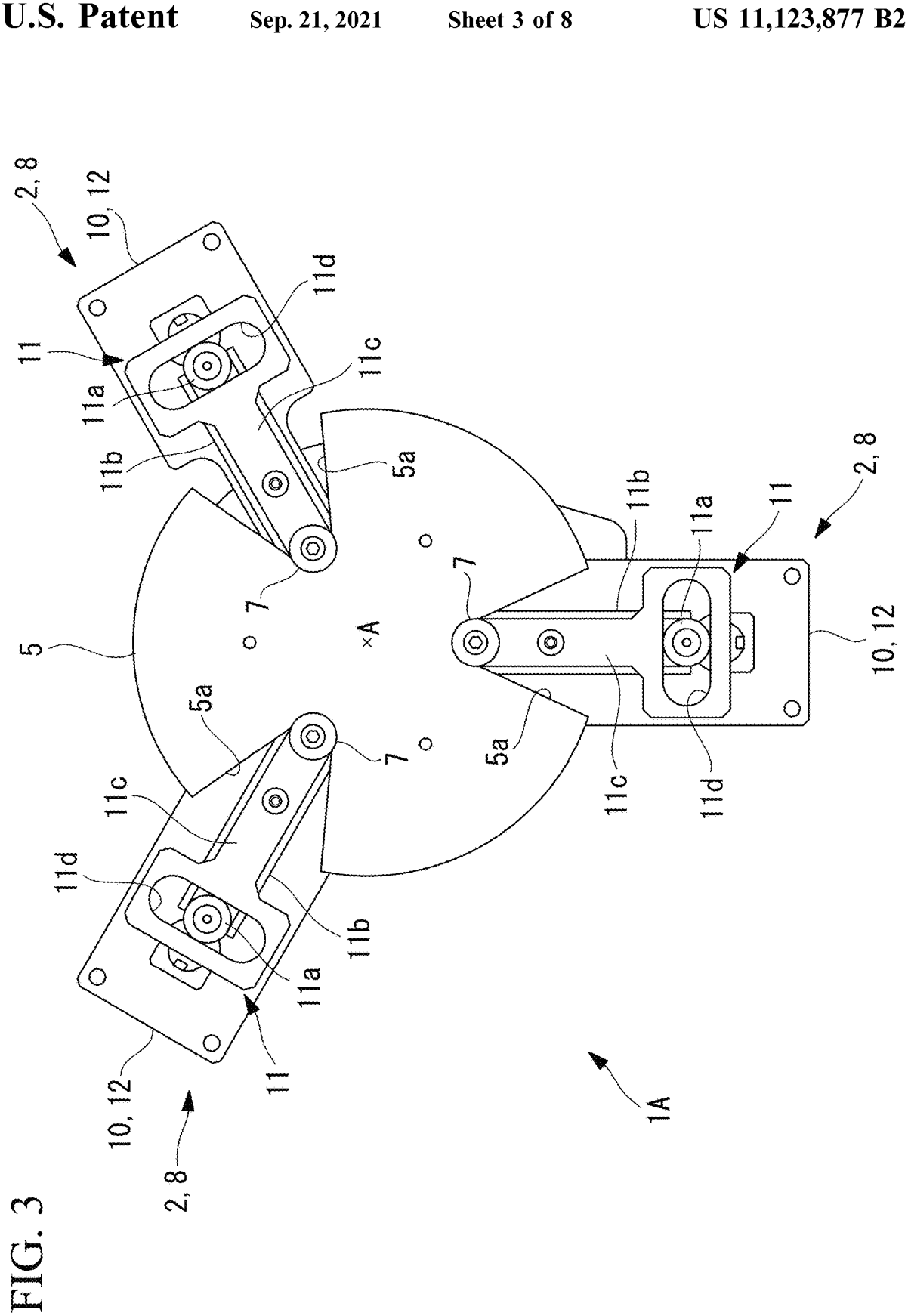
FIG. 3 is a bottom view in which the hand main body in FIG. 2 is viewed from a bottom side.

The robot hand 1 is provided with the hand main body 1A and a control unit 1B that is provided in the controller 40 and that controls the hand main body 1A. FIGS. 2 and 3 show the hand main body 1A. As shown in FIGS. 2 and 3, the hand main body 1A is provided with: a plurality of gripping units 2 that are disposed, with spacings therebetween, in a circumferential direction about a predetermined center axis A; a force sensor (center-of-gravity detecting unit) 3 for detecting a center-of-gravity position G of a workpiece W being gripped by the plurality of gripping units 2; pivoting supporting mechanisms 4 that support the individual gripping units 2 so as to be freely pivotable about the center axis A; and a pivoting restricting member 5 that mechanically restricts pivoting of the individual gripping units 2 within a predetermined angle range. The reference sign 6 indicates a hand flange that is attachable to/detachable from the wrist flange 32.

When gripping and transferring the workpiece W, the center axis A of the hand main body 1A is disposed in a vertical direction or a substantially vertical direction, the hand flange 6 is disposed on the top side of the hand main body 1A and gripping portions 7 (described later) of the gripping units 2 are disposed on the bottom side of the hand main body 1A. In the following, in the direction along the center axis A, a hand-flange-6 side is defined as the top side of the hand main body 1A and the opposite side from the hand flange 6 (gripping-portion-7 side) is defined as the bottom side of the hand main body 1A.

In the state in which the hand main body 1A is attached to the wrist flange 32, the center axis A of the hand main body 1A is aligned with the center axis (the sixth axis J6 in the case of a six-axis vertical articulated robot) of the wrist flange 32. The figures referred to show the hand main body 1A provided with three gripping units 2. In the following description, a case in which three gripping units 2 are provided will be described. However, the number of the gripping units 2 may be only two, or four or more.

Each gripping unit 2 is provided with the gripping portion 7 and a driving portion 8 that linearly moves the gripping portion 7.

Figure 4:
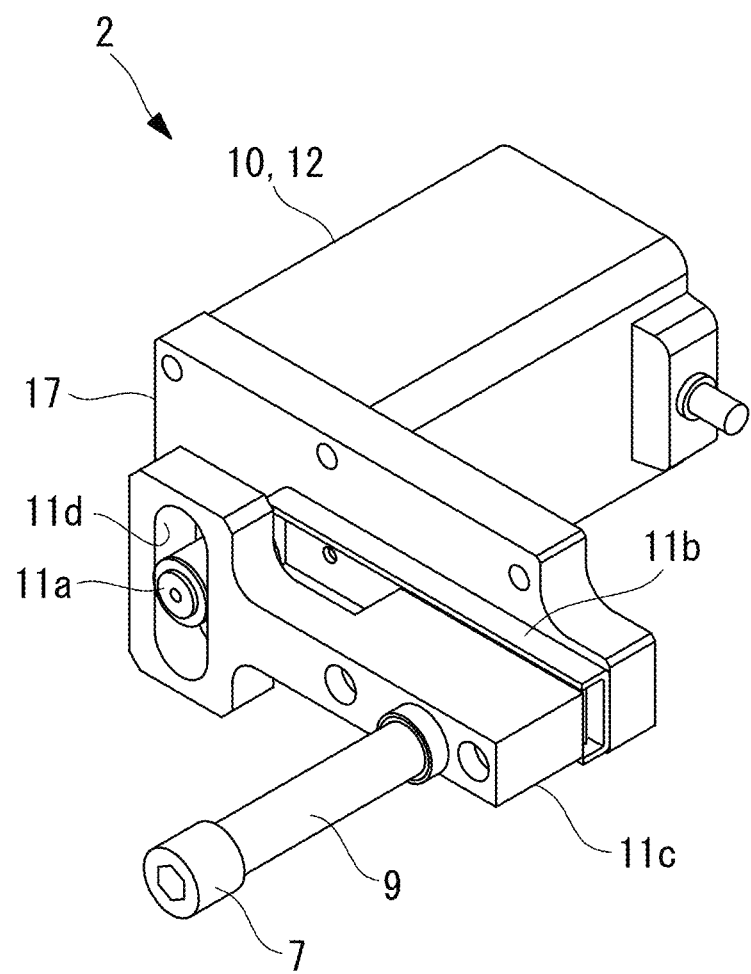
FIG. 4 is a perspective view in which a gripping unit provided in the hand main body in FIG. 2 is viewed from the bottom side.

The gripping portions 7 are portions that come into firm contact with inner surfaces of the workpiece W when gripping the workpiece W, and are secured to the bottom ends of shafts 9 that are parallel to the center axis A, as shown in FIG. 4.

Figure 5:
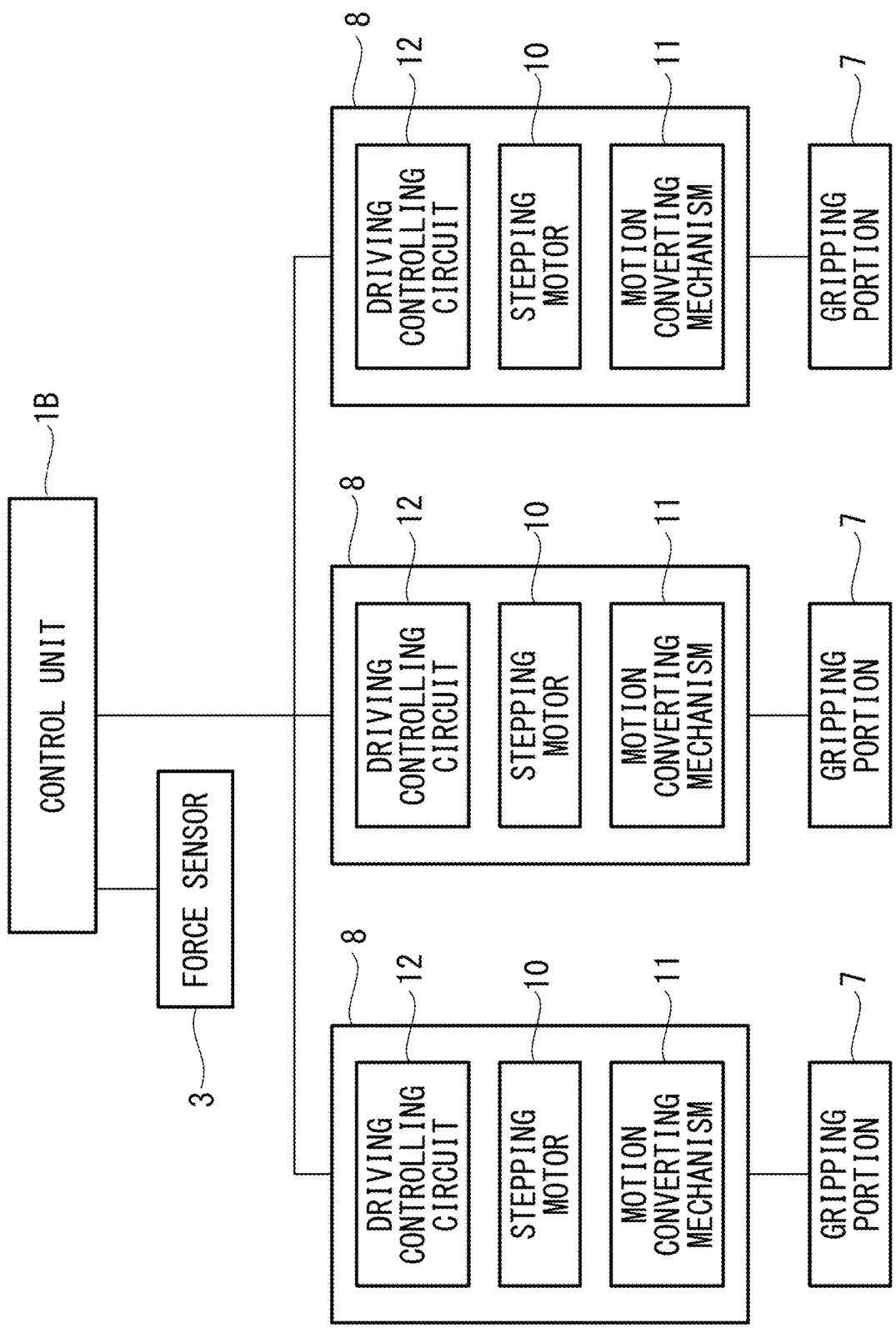
FIG. 5 is a block diagram of driving portions and a center-of-gravity detecting unit of the robot hand in FIG. 2.

The driving portions 8 support the top ends of the shafts 9, and cause the shafts 9 and the gripping portions 7 to be moved in closing directions in which these components are brought close to the center axis A and opening directions in which these components are moved away from the center axis A. The closing directions and the opening directions are directions that are orthogonal to the center axis A. Specifically, as shown in FIGS. 4 and 5, the driving portions 8 are provided with stepping motors 10, motion converting mechanisms 11 that convert the rotational motions of the stepping motors 10 to linear motions, and driving controlling circuits 12 that control driving of the stepping motors 10. Reducers may be provided between the stepping motors 10 and the motion converting mechanisms 11.

The stepping motors 10 are rotated by rotational angles in accordance with the number of driving pulses (number of pulses) input from the driving controlling circuits 12. The amounts by which the gripping portions 7 are linearly moved and the positions at which the gripping portions 7 are stopped are controlled by means of the number of pulses input to the stepping motors 10 from the driving controlling circuits 12.

As shown in FIG. 4, each of the motion converting mechanisms 11 is a scotch-yoke mechanism provided with an eccentric shaft 11a and a linear-motion guide 11b. The eccentric shaft 11a is eccentrically positioned with respect to the rotational axis of the stepping motor 10. In one end section of a slider 11c, which moves on the linear-motion guide 11b, an elongated hole 11d that extends in a direction that is orthogonal to the guiding directions of the linear-motion guide 11b (closing direction and opening direction of the gripping portion 7) is formed, and the eccentric shaft 11a is disposed in the elongated hole 11d. The top end of the shaft 9 is secured to the other end section of the slider 11c. As a result of the stepping motor 10 being rotated about a rotational axis, the eccentric shaft 11a is rotationally moved about the rotational axis, the rotational movement of the eccentric shaft 11a is converted to linear movement of the slider 11c, and thus, the shaft 9 and the gripping portion 7, which are secured to the slider 11c, are linearly moved.

The motion converting mechanisms 11 may be other arbitrary mechanisms that are capable of converting a rotational motion to a linear motion.

The three driving controlling circuits 12 generate driving pulses for moving the gripping portions 7 in the opening directions, individually, in response to hand-controlling signals for the opening operation transmitted from the control unit 1B, and individually supply the driving pulses to the stepping motors 10. By doing so, the three gripping portions 7 are moved in the opening directions in synchronization with each other, thus opening the three gripping portions 7.

The three driving controlling circuits 12 individually generate driving pulses for moving the gripping portions 7 in the closing directions in response to the hand-controlling signals for the closing operation transmitted from the control unit 1B, and individually supply the driving pulses to the stepping motors 10. By doing so, the three gripping portions 7 are moved in the closing directions in synchronization with each other, thus closing the three gripping portions 7.

The force sensor 3 is disposed between the three gripping units 2 and the wrist flange 32. The force sensor 3 is, for example, a six-axis sensor that detects forces Fx, Fy, and Fz in three-axial (X-axis, Y-axis, and Z-axis) directions that are orthogonal to each other and torques Tx, Ty, and Tz about three axes (X-axis, Y-axis, and Z-axis). In accordance with the positional relationship in the horizontal direction between the center axis A and the center-of-gravity position G of the workpiece W being gripped by the three gripping portions 7, the forces Fx, Fy, and Fz and the torques Tx, Ty, and Tz that act on the force sensor 3 change. The forces Fx, Fy, and Fz and the torques Tx, Ty, and Tz detected by the force sensor 3 are transmitted to the control unit 1B.

The control unit (center-of-gravity detecting unit) 1B calculates the center-of-gravity position G of the workpiece W on the basis of the forces Fx, Fy, and Fz and the torques Tx, Ty, and Tz. Next, the control unit 1B transmits the hand-controlling signals in accordance with the center-ofgravity position G of the workpiece W to the driving controlling circuits 12 of the individual driving portions 8.

For example, the control unit 1B calculates optimal positions of the individual gripping portions 7 on the basis of the center-of-gravity position G of the workpiece W. The optimal positions of the gripping portions 7 are, in one example, positions at which the center-of-gravity position G of the workpiece W is disposed vertically below the center axis A. For example, a table in which the center-of-gravity positions G of the workpieces W and the optimal positions of the gripping portions 7 are associated with each other may be stored in a storage unit (not shown), and the control unit 1B may read out the optimal positions associated with a center-of-gravity position G from the table.

The control unit 1B transmits hand-controlling signals for moving the gripping portions 7 to the respective optimal positions to the driving controlling circuits 12. The individual driving controlling circuits 12 generate the driving pulses in response to the hand-controlling signals, and supply the driving pulses to the stepping motors 10. By doing so, the three gripping portions 7 are moved to the respective optimal positions, and the workpiece W is gripped by the three gripping portions 7 at the position at which the center-of-gravity position G is disposed vertically below the center axis A.

Such a control unit 1B consists of a processor and a storage device provided in the controller 40. In other words, as a result of the processor executing processing in accordance with a hand-controlling program stored in the storage device, the aforementioned computational processing and the control of the hand main body 1A are realized.

The control unit 1B may control the stepping motors 10 via the driving controlling circuits 12 in directions in which the torques Tx, Ty, and Tz are decreased while monitoring the torques Tx, Ty, and Tz detected by the force sensor 3, and may calculate, as the optimal positions, the positions of the gripping portions 7 at which the torques Tx, Ty, and Tz become zero or substantially zero. As the center-of-gravity position G of the workpiece W approaches the center axis A in the horizontal direction, the torques Tx, Ty, and Tz detected by the force sensor 3 decrease, and, when the center-of-gravity position G of the workpiece W is disposed vertically below the center axis A, the torques Tx, Ty, and Tz detected by the force sensor 3 become zero.

Figure 6:
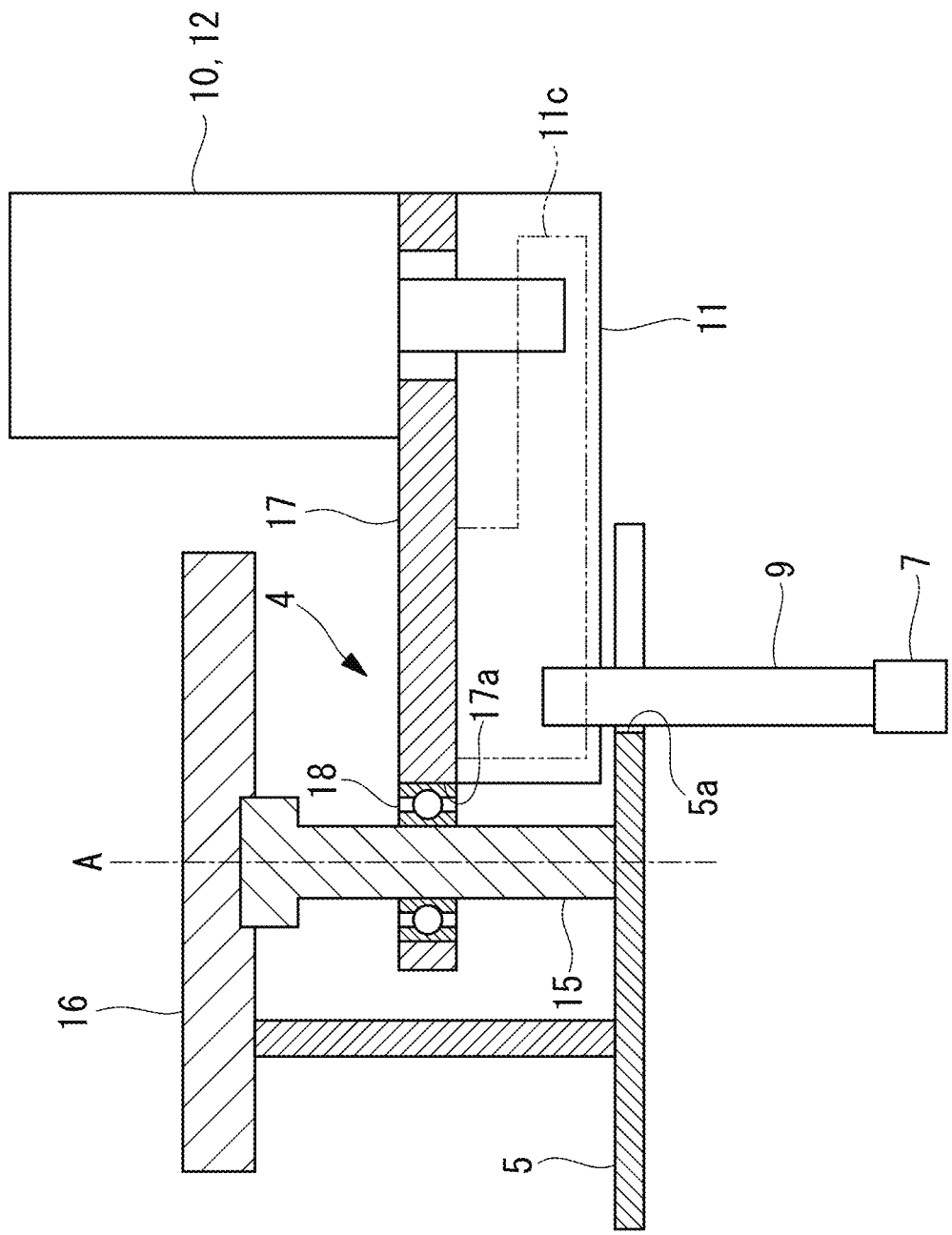
FIG. 6 is a schematic cross-sectional view showing the configuration of a pivoting supporting mechanism of the hand main body in FIG. 2.

As shown in FIG. 6, the pivoting supporting mechanisms 4 support the gripping units 2 so as to be freely pivotable about a central shaft 15, which is coaxial with the center axis A. A flange 16 is secured to the top end of the central shaft 15, and the flange 16 is secured to the wrist flange 32 of the robot 30 via the force sensor 3.

Specifically, the pivoting supporting mechanisms 4 are provided with plates 17 supported on the central shaft 15 by bearings 18. FIG. 6 shows only the pivoting supporting mechanism 4 of one of the gripping portions 7. The plates 17 extend in directions that are orthogonal to the center axis A, the gripping units 2 are secured to one of the end sections of the plates 17, and holes 17a through which the central shaft 15 passes are provided in the other end sections of the plates 17. The bearings 18 are disposed between the inner surfaces of the holes 17a and the outer surface of the central shaft 15. With the bearings 18, the plates 17 and the gripping units 2 are supported so as to be freely pivotable about the center axis A in accordance with external forces that act about the center axis A.

Biasing members (for example, springs) that bias the gripping units 2 into predetermined neutral positions may be provided so that the individual gripping units 2 are restored to predetermined neutral positions in a circumferential direction about the center axis A when the external forces are released.

The pivoting restricting member 5 is a plate-like member that is disposed between the gripping portions 7 and the driving portions 8 in the direction along the center axis A. The pivoting restricting member 5 is secured to the bottom end of the central shaft 15, and is disposed in a direction that is orthogonal to the center axis A. As shown in FIG. 3, the pivoting restricting member 5 has, at three locations at equal intervals in the circumferential direction, three notches 5a through which the shafts 9 respectively pass. In a plan view viewed in the direction along the center axis A, each notch 5a has a substantially triangular shape in which the width thereof gradually decreases toward the center axis A, and one of the apex portions is located on the center-axis-A side.

FIG. 3 shows a closed state in which the three gripping portions 7 are disposed at positions that are closest to the center axis A. In the closed state, the three shafts 9 are disposed at the apex portions in the notches 5a, which correspond to the respective origins. In the state in which the shafts 9 are disposed at the origins (apex portions), pivoting of the shafts 9 about the center axis A is prevented by the pivoting restricting member 5, and thus, the shafts 9 cannot be pivoted. On the other hand, in a state in which the shafts 9 are disposed outside from the origins (apex portions), as a result of the notches 5a having widths that are greater than the widths of the shafts 9, pivoting of the shafts 9 about the center axis A is allowed within angle ranges defined by the widths of the notches 5a.

Next, the operations of the robot hand 1 and the robot system 100, thus configured, will be described in terms of an example in which workpieces W having the same shape and dimensions are continuously transferred.

By operating the robot 30, the controller 40 causes the hand main body 1A to be moved above a workpiece W, and disposes the hand main body 1A in an attitude in which the center axis A is disposed in the vertical direction with the gripping portions 7 facing downward.

Figure 7A:
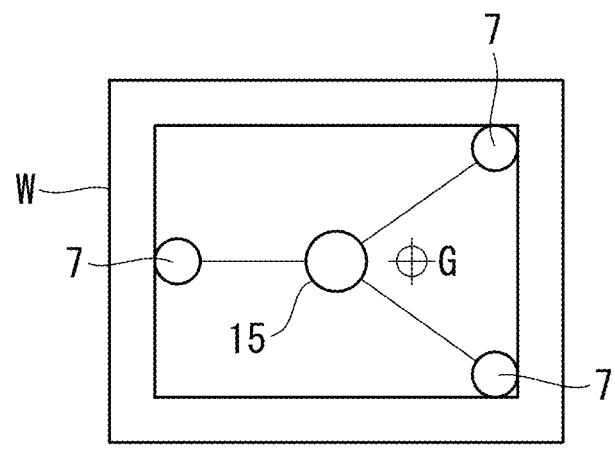
FIG. 7A is a plan view showing positions of three gripping portions in the state in which the center-of-gravity position of a workpiece is shifted in a horizontal direction from a center axis of the hand main body.
Figure 7B:
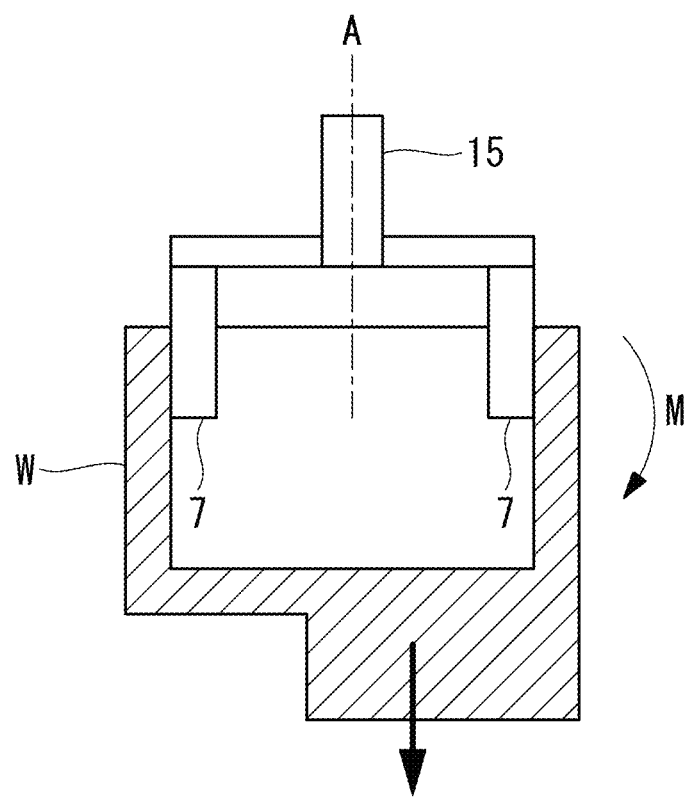
FIG. 7B is a longitudinal cross-sectional view showing the positions of the three gripping portions in the state in which the center-of-gravity position of the workpiece is shifted in the horizontal direction from the center axis of the hand main body.

Next, by operating the robot 30, the controller 40 causes the hand main body 1A, in which the three gripping portions 7 are in the closed state, to be lowered, and inserts the three gripping portions 7 inside the cylindrical workpiece W. Next, by causing the three gripping portions 7 of the hand main body 1A to be opened (for example, by causing the three gripping portions 7 to be moved by the same distance in the opening directions), the control unit 1B of the controller 40 causes the three gripping portions 7 to grip inner surfaces of the workpiece W, as shown in FIGS. 7A and 7B. Next, by operating the robot 30, the controller 40 causes the hand main body 1A and the workpiece W to be raised.

In the state in which the workpiece W is gripped by the three gripping portions 7, the force sensor 3 detects the forces Fx, Fy, and Fz and the torques Tx, Ty, and Tz due to gravity acting on the workpiece W. Also, the control unit 1B calculates the center-of-gravity position G of the workpiece W on the basis of the forces Fx, Fy, and Fz and the torques Tx, Ty, and Tz, and calculates the optimal positions of the gripping portions 7 on the basis of the center-of-gravity position G of the workpiece W.

Next, by operating the robot 30, the controller 40 causes the hand main body 1A and the workpiece W to be transferred to the transferring position, and causes the three gripping portions 7 to be closed. By doing so, the workpiece W is released from the gripping portions 7 and is disposed at the transferring position.

Figure 8A:
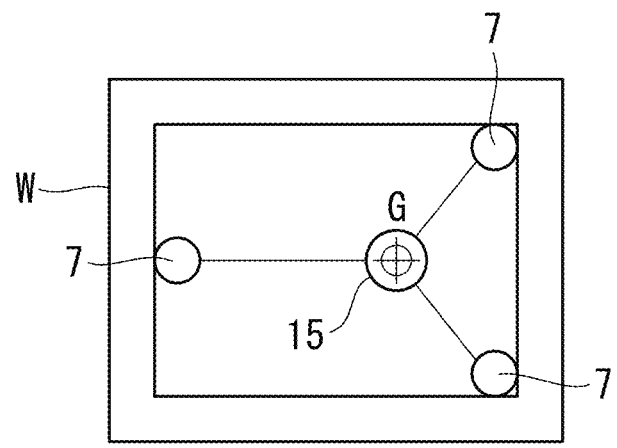
FIG. 8A is a plan view showing positions of the three gripping portions in a state in which the center-of-gravity position of the workpiece is disposed vertically below the center axis of the hand main body.
Figure 8B:
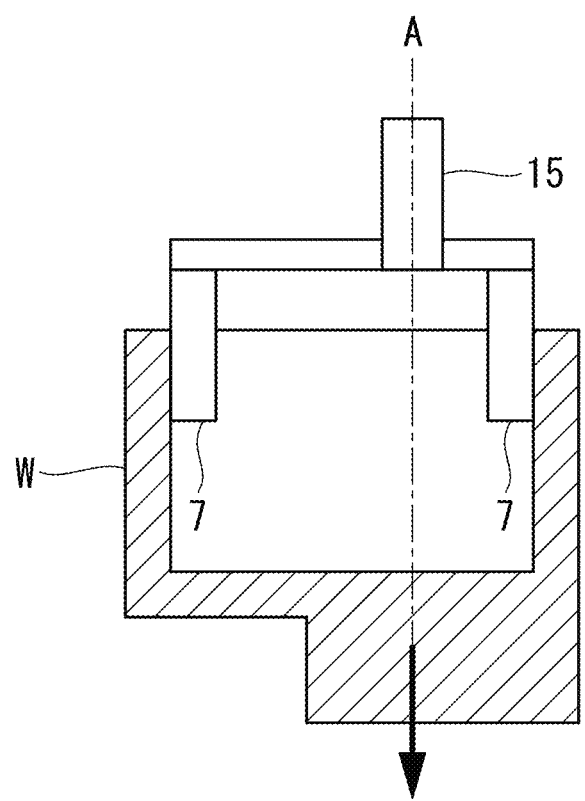
FIG. 8B is a longitudinal cross-sectional view showing the positions of the three gripping portions in the state in which the center-of-gravity position of the workpiece is disposed vertically below the center axis of the hand main body.

Subsequently, the controller 40 causes the robot 30 and the hand main body 1A to transfer the next workpiece W. Here, when the gripping portions 7 are opened or after the gripping portions 7 grip the workpiece W, the control unit 1B of the controller 40 transmits the hand-controlling signals for moving the gripping portions 7 to the optimal positions to the driving controlling circuits 12 of the driving portions 8. By doing so, the workpiece W is gripped by the three gripping portions 7 so that the center-of-gravity position G of the workpiece W is disposed vertically below the center axis A, as shown in FIGS. 8A and 8B.

The calculations of the center-of-gravity position G of the workpiece W and the optimal positions of the gripping portions 7 may be executed only when the workpiece W is gripped by the gripping portions 7 for the first time. The optimal positions of the individual gripping portions 7 that have been calculated once are stored in the storage unit (not shown). In the operation of gripping the workpiece W for the second time and thereafter, the control unit 1B causes the gripping portions 7 to be moved to the optimal positions stored in the storage unit.

Alternatively, the calculations of the center-of-gravity position G of the workpiece W and the optimal positions of the gripping portions 7 may be executed each time the workpiece W is gripped by the gripping portions 7. In this case, the positions of the three gripping portions 7 may be gradually optimized while repeatedly gripping the workpiece W, detecting the center-of-gravity position G, and calculating the optimal positions.

A vision sensor that recognizes the attitude of the workpiece W may be installed on the upstream side of the robot 30, and the attitude of the workpiece W at the time when the center-of-gravity position G is detected may be stored in association with the optimal positions of the individual gripping portions 7. The control unit 1B of the controller 40 may control the attitude of the hand main body 1A on the basis of the recognized attitude of the workpiece W so that the three gripping portions 7 grip the workpiece W in the attitude stored in the storage unit.

As has been described above, with this embodiment, the three gripping portions 7 respectively have degrees of freedom for two types of movement, namely, linear movement and pivoting, and are freely pivotable about the center axis A independently of each other. Therefore, in the process of opening the three gripping portions 7, the individual gripping portions 7 are moved in the opening directions while being passively pivoted about the center axis A along the shapes of the inner surfaces of the workpiece W after coming into contact with the inner surfaces of the workpiece W. In this way, there is an advantage in that, as a result of the relative positions of the three gripping portions 7 being changed in accordance with the shapes and dimensions of the inner surfaces of the workpiece W, it is possible to reliably grip, by means of the three gripping portions 7, various workpieces W having different shapes and dimensions of the inner surfaces.

In the case in which the center-of-gravity position G of the workpiece W is displaced from the center axis A in the horizontal direction, as shown in FIGS. 7A and 7B, a moment M due to gravity is generated in the workpiece W being gripped by the gripping portions 7, and moments also act on the hand main body 1A and the robot 30 due to this moment M. Due to the displacement of the center-of-gravity position G from the center axis A in the horizontal direction, the inertias that act on the hand main body 1A and the robot 30 increase. As a result, the gripping portions 7 are required to exert greater gripping forces in order to grip the workpiece W.

With this embodiment, the driving portions 8 adjust the positions of the three gripping portion 7 so as to be at the optimal positions at which the center-of-gravity position G of the workpiece W is disposed vertically below the center of the axis A. By doing so, there is an advantage in that the moments and the inertias that act on the hand main body 1A and the robot 30 are reduced, and thus, it is possible to stably grip, with smaller gripping forces, various workpieces W having different shapes and dimensions. By doing so, there is an advantage in that it is possible to achieve a size reduction of the hand main body 1A.

Although this embodiment has been described in terms of a case in which workpieces W having the same shape and dimensions are transferred, it is possible to apply the robot hand 1 of this embodiment to a case in which workpieces W having different shapes and dimensions are transferred.

For example, in a state in which the workpiece W is gripped by the gripping portions 7, the force sensor 3 detects the forces Fx, Fy, and Fz and the torques Tx, Ty, and Tz, and the control unit 1B calculates the center-of-gravity position G of the workpiece W and the optimal positions of the gripping portions 7. The control unit 1B controls the driving portions 8 and causes the three gripping portions 7 to be moved to the optimal positions while maintaining the state in which the workpiece W is being gripped. Alternatively, after the force sensor 3 detects the forces Fx, Fy, and Fz and the torques Tx, Ty, and Tz, the control unit 1B may cause the gripping portions 7 to be closed to release the workpiece W, may cause the gripping portions 7 to be opened again, and may adjust the positions of the gripping portions 7 so as to be at the optimal positions when gripping the workpiece W.

In this embodiment, although the robot hand 1 is of an inner-diameter chuck type that grips the inner surfaces of the cylindrical workpiece W, alternatively, the robot hand 1 may be of an outer-diameter chuck type that grips the outer surfaces of the workpiece W.

In the case of the outer-diameter chuck type, the workpiece W is gripped by closing the three gripping portions 7 in a state in which the three gripping portions 7 are disposed outside the workpiece W, and the workpiece W is released by opening the three gripping portions 7. Here, in the process of closing the three gripping portions 7, the respective gripping portions 7 are moved in the closing directions while being passively pivoted about the center axis A along the shapes of the outer surfaces of the workpiece W. In this way, as a result of the relative positions of the three gripping portions 7 being changed in accordance with the shapes and the dimensions of the outer surfaces of the workpiece W, it is possible to reliably grip, by means of the three gripping portions 7, various workpieces W having different shapes and dimensions of the outer surfaces.

In this embodiment, although the single force sensor 3 disposed between the wrist flange 32 and the three gripping units 2 detects the center-of-gravity position G of the workpiece W, alternatively, each gripping unit 2 may be provided with a force sensor 3.

Even with such a configuration, it is possible to calculate the center-of-gravity position G of the workpiece W on the basis of the forces Fx, Fy, and Fz and the torques Tx, Ty, and Tz detected by the respective force sensors 3.

In this embodiment, the control unit 1B, which performs the computational processing of the center-of-gravity position G of the workpiece W and the optimal positions of the gripping portions 7, as well as the control of the driving portions 8, is provided in the controller 40; however, alternatively, the control unit 1B may be provided in the hand main body 1A. Specifically, the processor and the storage unit required to perform the above-described computational processing and control may be provided in the hand main body 1A.

In this embodiment, although all of the gripping units 2 are freely pivotable, alternatively, only some of the gripping units 2 need be freely pivotable.

For example, two of the gripping units 2 may be freely pivotable and one of the gripping units 2 may be incapable of being pivoted. As a result of at least one of the gripping units 2 being freely pivotable, it is possible to flexibly change the relative positions of the three gripping portions 7 in accordance with the shapes of the inner surfaces or outer surfaces of the workpiece W.

Although this embodiment has been described in terms of a case in which the center-of-gravity position G of the workpiece W is positioned inside the three gripping units 2 in the horizontal direction, it is also possible to apply the robot hand 1 of this embodiment to gripping of the workpiece W in which the center-of-gravity position G is positioned outside the three gripping units 2 in the horizontal direction. For example, the robot hand 1 may grip, with the two of the gripping portions 7, one end section of the workpiece W in the horizontal direction.

In this case, because it is not possible to dispose the center-of-gravity position G of the workpiece W vertically below the center axis A, the positions of the three gripping portions 7 are adjusted by the driving portions 8 so that the center-of-gravity position G of the workpiece W is brought as close to the center axis A as possible.

In this embodiment, although the force sensor 3 is provided, it is not necessarily required to provide the force sensor 3 in the case in which the center-of-gravity position G of the workpiece W is known.

In this case, the optimal positions of the respective gripping units 2 at which the center-of-gravity position G of the workpiece W is aligned with the center axis A may be stored in a storage unit (not shown), and the driving portions 8 may cause the gripping portions 7 to be moved to the optimal positions stored in the storage unit.

As a result, the following aspect is derived from the above described embodiment.

An aspect of the present invention is a robot hand including: a plurality of gripping portions that are disposed, with spacings between each other, in a circumferential direction about a predetermined axis, and that grip a workpiece; a plurality of driving portions, each of which is provided so as to correspond to one of the plurality of gripping portions, that cause the corresponding gripping portions to be linearly moved in closing directions in which the gripping portions are brought close to the predetermined axis and opening directions in which the gripping portions are moved away from the predetermined axis; and a center-of-gravity detecting unit that detects a center-of-gravity position of the workpiece being gripped by the plurality of gripping portions, wherein each of the plurality of driving portions adjusts, on the basis of the center-of-gravity position of the workpiece detected by the center-of-gravity detecting unit, the position of the corresponding gripping portion in a direction in which the center-of-gravity position is brought closer to the predetermined axis.

The robot hand according to this aspect is attached, for example, to a wrist flange of a robot, is brought close to the workpiece from above by means of the operation of the robot in a state in which the predetermined axis is disposed in a substantially vertical direction, and grips and releases the workpiece by opening and closing the plurality of gripping portions. For example, inner surfaces of the workpiece are gripped by opening the plurality of gripping portions disposed inside a cylindrical workpiece, and the workpiece is released by closing the plurality of gripping portions. Alternatively, outer surfaces of the workpiece are gripped by closing the plurality of gripping portions disposed outside the workpiece, and the workpiece is released by opening the plurality of gripping portions.

In this aspect, the driving portions are individually provided for the gripping portions. Thus, as a result of changing the relative positions of the plurality of gripping portions in accordance with the shapes and dimensions of the inner surfaces or outer surfaces of the workpiece, it is possible to grip various workpieces having different shapes and dimensions.

The center-of-gravity position of the workpiece being gripped by the plurality of gripping portions is detected by the center-of-gravity detecting unit, and the positions of the individual gripping portions are adjusted by the driving portions in the directions in which the center-of-gravity position of the workpiece is brought closer to the predetermined axis. In the state in which the positions of the gripping portions have been adjusted, moments and inertias that act on the robot hand, due to displacement of the center-of-gravity position of the workpiece in a horizontal direction from the predetermined axis, are reduced. Therefore, it is possible to stably grip various workpieces with smaller gripping forces, and it is possible to achieve a size reduction of the robot hand.

In the above-described aspect, each of the plurality of driving portions may adjust the position of the corresponding gripping portion so as to be at a position at which the center-of-gravity position of the workpiece detected by the center-of-gravity detecting unit is disposed vertically below the predetermined axis.

In a state in which the center-of-gravity position of the workpiece is disposed vertically below the predetermined axis, in many cases, the moments and the inertias that act on the gripping portions are minimized. Therefore, it is possible to grip the workpiece with minimum gripping forces.

In the above-described aspect, at least one of the plurality of gripping portions may be supported so as to be freely pivotable about the predetermined axis.

With this configuration, the at least one of the gripping portions is passively pivoted along the shapes of the inner surfaces of the workpiece in the process of being moved in the opening directions. Alternatively, the at least one of the gripping portions is passively pivoted along the shapes of the outer surfaces of the workpiece in the process of being moved in the closing directions. By doing so, it is possible to more flexibly adjust the relative positions of the plurality of gripping portions in accordance with the shapes and dimensions of the inner surfaces or outer surfaces of various workpieces.

The above-described aspect may be provided with a pivoting restricting member that restricts pivoting of the at least one of the gripping portions about the predetermined axis within a predetermined angle range.

In the case in which there is no restriction on the range in which the gripping portions can be pivoted, the plurality of gripping portions may become disposed in a biased manner. As a result of restricting pivoting of the gripping portions within the predetermined angle range by means of the pivoting restricting member, it is possible to prevent the plurality of gripping portions from becoming disposed in an excessively biased manner.

REFERENCE SIGNS LIST 1 robot hand
1A hand main body
1B control unit (center-of-gravity detecting unit)
2 gripping unit
3 force sensor (center-of-gravity detecting unit)
4 pivoting supporting mechanism
5 pivoting restricting member
7 gripping portion
8 driving portion
30 robot
31 robot arm
40 controller
100 robot system
A center axis (predetermined axis)

The invention claimed is:

1. A robot hand comprising:
a plurality of gripping portions that are disposed, with spacings between each other, in a circumferential direction about a predetermined axis extending in a vertical direction, and that are configured to be linearly moved independently of each other in directions in which the plurality of gripping portions are brought close to the predetermined axis and directions in which the plurality of gripping portions are moved away from the predetermined axis to grip a workpiece;
a controller that is configured to cause each of the plurality of gripping portions to grip the workpiece and that is configured to detect a center-of-gravity position of the gripped workpiece; and
wherein the controller is configured to cause each of the plurality of gripping portions to be linearly moved to change a relative position between each of the plurality of gripping portions and the predetermined axis on the basis of the detected center-of-gravity position so that a position of the predetermined axis in a horizontal direction is brought closer to the detected center-of-gravity position.

2. The robot hand according to claim 1, wherein at least one of the plurality of gripping portions is supported so as to be freely rotatable about the predetermined axis.

3. The robot hand according to claim 2, further comprising a pivoting restricting member configured to restrict pivoting of the at least one of the gripping portions about the predetermined axis within a predetermined angle range.

4. The robot hand according to claim 1, further comprising:
a first shaft, an axis of which is the predetermined axis;
a plurality of second shafts extending in parallel to the first shaft;
wherein each of the plurality of gripping portions is secured to a bottom end of each of the plurality of second shafts; and
wherein the controller is configured to cause the plurality of second shafts to be linearly moved independently of each other in directions in which the plurality of second shaft are brought close to the first shaft and directions in which the plurality of second shaft are moved away from the first shaft.

* * * * *